Feb. 3, 1959    D. B. PECK    2,872,600

FERROELECTRIC TRANSDUCER

Filed April 14, 1953

INVENTOR.
DAVID B. PECK
BY
GOLLEY
HIS ATTORNEYS

United States Patent Office 2,872,600
Patented Feb. 3, 1959

2,872,600
FERROELECTRIC TRANSDUCER

David B. Peck, Williamstown, Mass., assignor to Sprague Electric Company, North Adams, Mass., a corporation of Massachusetts Application April 14, 1953, Serial No. 348,646

3 Claims. (Cl. 310—8.7)

This invention relates to piezoelectric devices and more particularly relates to devices employing polarized ferroelectric materials, such as barium titanate, for the generation of electrical energy.

During the early 40's, the remarkable electrical properties of barium titanate and other alkali earth metal titanates were noted and the material rapidly gained importance for the preparation of small ceramic capacitors, largely because of the high dielectric constant of the titanates as compared to titanium dioxide. Shortly thereafter it was found that the titanates, when properly manufactured, possessed unusual ferroelectric properties. It was found for example that if one polarized the titanate polycrystalline mass, through appropriate application of voltage to electrodes placed thereon, a device was produced which would release energy to an outside load circuit under application of mechanical force. Now this effect has been applied to the fabrication of numerous commercial and military devices. Problems connected with the production of mechanically durable and electrically reproducible units have been numerous.

It is an object of the present invention to overcome the foregoing and related disadvantages. A further object is to produce a novel device which will yield predictable and uniform electrical energy as a result of mechanical force applied thereto. Additional objects will become apparent from the following description and claims.

These objects are attained in accordance with the present invention wherein there is produced an electrically responsive device comprising a polycrystalline mass of a ferroelectric material polarized between at least two electrodes applied to the surface thereof, said device being mounted in a partially open metal housing and being fixed in relation and slight compression thereto under all normal operating temperatures by means of a substantially rigid resinous material bonded to said ferroelectric device and to the housing.

In a more restricted sense the invention is concerned with an energy source for fuses and other devices comprising a polycrystalline mass of barium titanate provided with two firmly adherent electrode layers between which said mass is polarized, one of said electrodes being bonded to a metal housing and the other of said electrodes being connected to an insulated terminal, the device being firmly secured with compression on said polycrystalline mass at all normal operating temperatures by a cross linked epoxy resin.

In one of its limited embodiments the invention is concerned with a device for producing an energy pulse of substantial magnitude comprising an annular ring of a polycrystalline titanate mass predominating in barium and containing some lead, one side and the outer peripheral edge of said annular ring being provided with an electrode layer and the other side and the inner peripheral edge being provided with an electrode layer, in polycrystalline mass being polarized between said electrodes, said ring being mounted in a cylindrical can closure, one end of said cylinder being closed and said first electrode being secured electrically to said closure and disposed abutting the end of said closure, the other of said electrodes being connected to an insulated terminal, the area within the annular opening and above the open end of said annular ring being substantially completely filled with a resin which maintains said ring in firm mechanical contact with said housing throughout the normal operating temperature range.

My invention will be described further with reference to the appended drawings in which.

Figure 1:
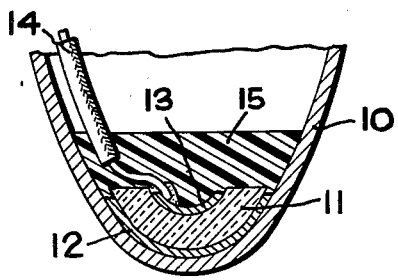
Figure 1 shows a cross section of one type of energy source of my invention.

Referring more specifically to Figure 1 there is shown a typical ogive assembly useful in various types of bombs, shells and other missiles, in which detonation is preferably achieved through electrical fusing. Housing 10 consists of a conical metal shell in which the apex of the cone is normally turned in to form a circular or rather spherical closure. Polycrystalline mass 11 is designed to fit in the partially spherical end closure of housing 10 and is provided with electrode layers 12 and 13. Electrode layer 13 is provided with an insulated terminal wire 14.

The polycrystalline mass 11 is polarized by application of a polarizing voltage between electrodes 12 and 13 for a selected time and temperature, as is well known in the art. Resin closure 15 seals the assembly from humidity and external influence; but more important, is introduced in a manner such as to maintain the electrical element 11 tightly deposited against the inner periphery of shell 10 throughout the normal operating range. This compression action, even though it may not be great in magnitude, is of considerable importance in obtaining uniform and predictable electrical response due to mechanical force application to the spherical portion of ogive 10. Typical resins for this use are later described in some detail. Properly assembled I have observed that my device is electrically responsive even when the mechanical force is applied to the conical portions of said ogive providing the resin mass 15 abuts the conical portion of shell 10 which is actually struck. While the reason for this performance is not fully known to me it appears that my compression maintaining mass 15 not only serves to retain the mass 11 in its proper position even during rough handling, accidental drops and the like, but also serves to transmit shock waves from other directions.

Even on severe mechanical impact which cracks or even shatters polycrystalline mass 11, I have found that the greater toughness of the resin mass 15, in addition to its unusual adherence to metals and ceramic, results in the retainment of mass 11 in its proper position despite mechanical rupture of the latter. This dual function is of considerable importance where the device is to be subject to rough handling.

Figure 2:
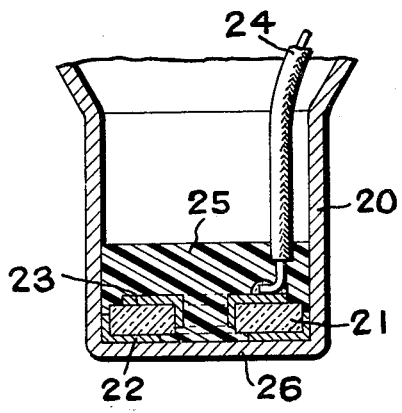
Figure 2 shows a cross sectional drawing of another type of device produced in accordance with my invention.

Figure 2 shows a preferred assembly of my invention which retains the electrical advantages of the structure shown in Figure 1 while at the same time being somewhat simpler to construct and more adaptable to any type of shell or bomb assembly. Reference numeral 20 represents the substantially cylindrical metal housing member which forms, with its closed end 26, a housing for annular ring 21 of polarizable ferroelectric material. The thickness of this ring, or more specifically the axial length, may be any desired dimension required for the particular application; thicker pieces normally give somewhat higher voltages for any given mechanical force. Electrode layer 22 is provided on one of the lower face sides of ring 21 and extends on to the outer peripheral surface, thus being in effect on two sides of the annular ring. Counter electrode 23 is disposed upon the opposite face of mass 21 and extends over the inner peripheral surface of the annular ring. Terminal wire 24 is secured to electrode 23 while electrode 22 is electrically connected to metal housing 20, although in special instances electrode 22 may have its own special terminal element. Resin mass 25 not only seals the housing 20 but also firmly maintains the mechanical position of annular ring 21, even to the extent of filling the axial opening therein.

This particular assembly is even more effective for glancing blows and blows on the side of housing 20 since it is in effect a three dimensional device. The presence of the annular opening actually appears to lead to improved performance and when provided with the electrode arrangement shown will yield more uniform output irrespective of the direction from which the mechanical force is applied.

When the operation of the device is not such as to effect complete and immediate destruction of the ogive or nose assembly, and where a time delay and energy storage arrangement is desired, an electrical capacitor or complete RC circuit may be introduced within the area encompassed by the encapsulating resin.

Further, my devices are useful not only in fuse and similar assemblies but also for many commercial applications involving determination and calibration of mechanical forces, frequencies and the like.

The resins which exert this desired compressive action upon their transition into a highly thermoset infusible form are preferably those falling within the well-known class of epoxy resins which have been extensively covered by journal publications and in the patent literature which references are British Plastics for November 1948, pages 521–527, Electrical Manufacturing, pages 78–81, 164–166, and United States Patents Nos.:

| | |
|---|---|
| 2,324,483 | 2,569,920 |
| 2,506,486 | 2,510,886 |
| 2,444,333 | 2,542,664 |
| 2,615,007 | 2,500,449 |
| 2,592,560 | 2,609,357 |
| 2,510,885 | 2,615,008 |
| 2,604,457 | 2,512,996 |

A further class of resins which are indicative of the properties of our cross-linked infusible resins having this desirable compressive action are highly cross-linked copolymers of polystyrene, and various polyesters. The preferred resins must adhere most tenaciously to the polycrystalline mass and the conical portion of the shell so that regardless of the extent to which the polycrystalline mass is fractured in transit the resin acts to maintain the polycrystalline mass in intimate contact. These resins upon undergoing the transformation from the cross-linked to the highly cross-linked state thus preferably undergo a contraction in volume during the orientation into the cross-linked structure and this contraction thus exerts mechanical force upon the polycrystalline mass so as to force its periphery into a most intimate contact with the outer shell casing so that an appreciable impact upon the casing, regardless of its center of contact, would transmit a strong mechanical force against the polycrystalline mass so as to produce the required electrical voltage.

The preferred polycrystalline mass consists of the ferroelectric body formed by firing a predominant amount of barium titanate with a minor amount of lead titanate but numerous other piezoelectric systems may be employed. The electrodes are usually fired on silver but resin bonded silver electrodes and cements may also be used. In such cases it is not necessary to solder the so-called grounded electrode to the housing since the conducting cement will achieve both electrical and mechanical connection.

While my invention has been directed in particular to the use of a metal housing, it need not be magnetic in nature nor indeed does it have to be metallic at all. Plastic materials such as polytetrafluoroethylene, phenol-formaldehyde resins, epoxy resins and the like may be used as well as ceramic and glass housings. The elasticity and other characteristics of such housings may be selected in accordance with the particular application.

It is to be understood that my invention is not intended to include the polarization of barium titanates but rather the specific constructions such as the annular ring type shown in Figure 2 and of the housing arrangement such as shown in Figures 1 and 2 whereby the optimum use can be made of the polarized material.

As many apparently widely different embodiments of this invention may be made without departing from the spirit and scope hereof, it is to be understood that the invention is not limited to the specific embodiments hereof except as defined in the appended claims.

What is claimed is:

1. An electrically responsive device comprising a polycrystalline mass of a ferroelectric material polarized between at least two electrodes applied to the surface thereof, said device being fixedly mounted against the inner surface of a partially open metal housing and being held against said surface by means of a substantially rigid resinous material encasing said ferroelectric mass and bonded to the housing, said resinous material being cured in situ and of the thermosetting type that causes this curing to subject the ferroelectric mass to compression against the housing.

2. A device for producing an energy pulse of substantial magnitude comprising an annular ring of a polycrystalline titanate mass predominating in barium titanate with a minor amount of lead titanate, one side and the outer peripheral edge of said annular ring being provided with a first electrode layer and the other side and the inner peripheral ring being provided with a second electrode layer, the polycrystalline mass being polarized between said electrodes, said ring being mounted in a cylindrical can, one end of said cylinder being closed and said first electrode being secured electrically to and held firmly abutting the closure, the other of said electrodes being connected to a lead insulated from the can, said other side of the ring and the annular opening being covered by a resin mass which is cured in situ and is of the thermosetting type in which this curing maintains said ring in compressional contact with said can throughout the normal operating temperature range.

3. An energy source for fuses having a metal housing with a tapered head, a spherical apex for the head, a ferroelectric mass shaped to fit against the inner surface of the apex and provided with two electrodes, one of said electrodes being conductively connected to the metal housing, the other of said electrodes connected to an insulated lead, said mass being compressively secured in fixed relationship against said metal housing by a rigid thermoset resin that is cured in situ and develops compressive forces as a result of the curing.

References Cited in the file of this patent
UNITED STATES PATENTS

| | | |
|---|---|---|
| 1,830,328 | Nicolson | Nov. 3, 1931 |
| 2,133,642 | Pierce | Oct. 18, 1938 |
| 2,448,352 | Carlin | Aug. 31, 1940 |
| 2,479,926 | Gravely | Aug. 23, 1949 |
| 2,507,636 | Kistler | May 16, 1950 |
| 2,511,624 | D'Halloy | June 13, 1950 |
| 2,514,297 | Smith | July 4, 1950 |
| 2,558,563 | Janssen | June 26, 1951 |